US010890129B1

(12) United States Patent
McMeekin (10) Patent No.: US 10,890,129 B1
(45) Date of Patent: Jan. 12, 2021

(54) HIGH PRESSURE LOOP EXHAUST GAS RECIRCULATION AND TWIN SCROLL TURBOCHARGER FLOW CONTROL

(71) Applicant: Michael S McMeekin, Auburn Hills, MI (US)

(72) Inventor: Michael S McMeekin, Auburn Hills, MI (US)

(73) Assignee: FCA US LLC, Auburn Hills, MI (US)

(*) Notice: Subject to any disclaimer, the term of this patent is extended or adjusted under 35 U.S.C. 154(b) by 45 days.

(21) Appl. No.: 16/444,425

(22) Filed: Jun. 18, 2019

(51) Int. Cl.
| F02D 41/00 | (2006.01) |
| F02B 37/02 | (2006.01) |
| F02M 26/09 | (2016.01) |
| F02M 26/16 | (2016.01) |
| F02M 26/66 | (2016.01) |
| F02M 26/05 | (2016.01) |
| F02M 26/51 | (2016.01) |
| F02M 26/68 | (2016.01) |
| F02D 13/02 | (2006.01) |
| F02B 37/18 | (2006.01) |

(Continued)

(52) U.S. Cl.
CPC ........ F02D 41/0077 (2013.01); F02B 37/025 (2013.01); F02B 37/183 (2013.01); F02D 13/0242 (2013.01); F02M 26/05 (2016.02); F02M 26/09 (2016.02); F02M 26/16 (2016.02); F02M 26/51 (2016.02); F02M 26/66 (2016.02); F02M 26/68 (2016.02); F02D 2041/001 (2013.01); F02M 26/23 (2016.02); F02M 26/34 (2016.02)

(58) Field of Classification Search
CPC ... F02D 41/0077; F02B 37/025; F02M 26/05; F02M 26/08; F02M 26/09; F02M 26/14; F02M 26/16; F02M 26/34; F02M 26/51; F02M 26/66; F02M 26/68; F02M 26/72
See application file for complete search history.

(56) References Cited

U.S. PATENT DOCUMENTS

| 4,611,465 A | * | 9/1986 | Kato | F02B 37/183 |
| | | | | 60/602 |
| 5,943,864 A | * | 8/1999 | Sumser | F01D 17/148 |
| | | | | 60/602 |

(Continued)

FOREIGN PATENT DOCUMENTS

JP 2004124729 A 4/2004

*Primary Examiner* — Sizo B Vilakazi
*Assistant Examiner* — Anthony L Bacon
(74) *Attorney, Agent, or Firm* — Ralph E Smith (57) ABSTRACT

An exhaust flow control system comprises a housing defining first and second passages that are fluidly connected to first and second scrolls of a twin scroll turbocharger and to a high pressure exhaust gas recirculation (HPEGR) system, a poppet valve configured to (i) in an open position, fluidly connect the first and second scrolls to each other and to the HPEGR system via the first and second passages and (ii) in a closed position, fluidly disconnect the first and second scrolls from each other and from the HPEGR system, and a controller configured to command the poppet valve to one of the open and closed positions based on one or more engine operating parameters thereby allowing the twin scroll turbocharger to operate in both a twin scroll mode and a mono scroll mode while also allowing for HPEGR control with minimal additional system volume.

13 Claims, 7 Drawing Sheets

(51) Int. Cl.
  *F02M 26/23* (2016.01)
  *F02M 26/34* (2016.01)

(56) References Cited

U.S. PATENT DOCUMENTS

| | | | |
|---|---|---|---|
| 6,269,643 B1* | 8/2001 | Schmidt | F02B 37/24 60/602 |
| 6,973,787 B2* | 12/2005 | Klingel | F02B 37/013 60/612 |
| 7,644,586 B2 | 1/2010 | Yamagata | |
| 9,157,380 B2 | 10/2015 | Styles et al. | |
| 9,506,396 B2 | 11/2016 | Styles et al. | |
| 2008/0000229 A1* | 1/2008 | Kuspert | F02B 37/18 60/605.2 |
| 2010/0024419 A1* | 2/2010 | Pierpont | F01N 13/107 60/624 |
| 2012/0279215 A1* | 11/2012 | Roth | F02B 37/025 60/599 |
| 2015/0047342 A1* | 2/2015 | McConville | F02D 41/0007 60/600 |
| 2016/0025044 A1* | 1/2016 | Martinez-Botas | F02B 37/24 60/605.2 |

* cited by examiner

HIGH PRESSURE LOOP EXHAUST GAS RECIRCULATION AND TWIN SCROLL TURBOCHARGER FLOW CONTROL

FIELD

The present application generally relates to twin scroll turbochargers and, more particularly, to flow control systems in an engine having a twin scroll turbocharger and a high pressure exhaust gas recirculation (HPEGR) system.

BACKGROUND

A turbocharger is a device that utilizes the energy of exhaust gas produced by an internal combustion engine to increase an air charge provided to the engine, thereby allowing the engine to combust a larger air/fuel charge to produce more drive torque. The exhaust gas powers a turbine or scroll, which in turn powers a compressor via a shaft. A twin scroll turbocharger is a specific configuration that has two separate scrolls that are powered by exhaust gas produced by different groups of cylinders of the engine. This allows the twin scroll turbocharger to maximize the engine's pulse energy, thereby improving low speed boost availability. This configuration, however, may result in high back-pressure and pumping losses at high speed/load operation of the engine, which in turn may result in reduced engine efficiency and increased exhaust gas temperatures.

A high pressure exhaust gas recirculation (HPEGR) system recirculates exhaust gas from a point upstream of the turbocharger scrolls back into an induction system of the engine. HPEGR systems are typically used to provide EGR during high speed/load engine operation, thereby reducing emissions and required component protection thermal enrichment. Thus, an HPEGR system could be utilized to mitigate or eliminate the above-described drawbacks of twin scroll turbochargers. HPEGR systems, however, take exhaust gas energy that would otherwise power the turbocharger's scrolls, which results in reduced low speed boost availability. Accordingly, while such turbocharger and HPEGR systems do work well for their intended purpose, there remains a need for improvement in the relevant art.

SUMMARY

According to one example aspect of the invention, an exhaust flow control system for an engine of a vehicle, the engine having a twin scroll turbocharger and a high pressure exhaust gas recirculation (HPEGR) system, is presented. In one exemplary implementation, the exhaust flow control system comprises: a housing defining first and second passages that are fluidly connected to first and second scrolls of the twin scroll turbocharger and to the HPEGR system a flow control system comprising: a poppet valve configured to (i) in an open position, fluidly connect the first and second scrolls to each other and to the HPEGR system via the first and second passages and (ii) in a closed position, fluidly disconnect the first and second scrolls from each other and from the HPEGR system and a controller configured to command the poppet valve to one of the open and closed positions based on one or more operating parameters of the engine, thereby allowing the twin scroll turbocharger to operate in both a twin scroll mode and a mono scroll mode depending on the one or more engine operating parameters while also allowing for HPEGR control with minimal additional system volume.

In some implementations, the housing is a housing of the twin scroll turbocharger.

In other implementations, the housing is a housing of an integrated exhaust manifold at least partially integrated into a cylinder head of the engine, wherein the first and second passages are also fluidly connected to first and second sets of cylinders of the engine, respectively. In some implementations, the engine is an in-line four cylinder engine and the first set of cylinders comprises a first cylinder and a fourth cylinder and the second set of cylinders comprises a second cylinder and a third cylinder. In some implementations, the exhaust flow control system further comprises a cooling system configured to cool the integrated exhaust manifold, the exhaust gas therein, and the poppet valve. In some implementations, the cooling system is a water jacket.

In some implementations, the controller is configured to command the poppet valve to the open position when at least one of engine speed and engine load exceeds a respective threshold. In some implementations, the controller is configured to command the poppet valve to the closed position when engine speed is less than a threshold. In some implementations, the controller is configured to command the poppet valve to the open and closed positions to (i) decrease pumping mean effective pressure (PNEP) of the engine, (ii) decrease thermal enrichment of the exhaust gas produced by the engine, and (iii) decrease brake-specific fuel consumption (BSFC) of the engine.

In some implementations, the poppet valve comprises a plunger or mushroom valve member that is moved between the open and closed positions by an actuator that is electronically controlled by the controller. In some implementations, the HPEGR system further comprises an HPEGR butterfly valve that is controlled by the controller to regulate flow through the HPEGR system. In some implementations, the open and closed positions are fully-open and fully-closed positions, respectively, and wherein the poppet valve is configured to operate in only one of these two positions. In some implementations, the engine is a four cylinder engine having a first two cylinders fluidly connected to the first scroll and a second two cylinders fluidly connected to the second scroll.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there remains a need for an improved flow control system for an engine having a twin scroll turbocharger and a high pressure exhaust gas recirculation (HPEGR) system. One possible solution would be to include additional exhaust piping and multiple control valves (e.g., butterfly valves) to regulate the amount of exhaust gas flowing to each of the scrolls and to the HPEGR system. This type of solution, however, is costly because there are multiple control valves and multiple possible failure scenarios and it substantially increases packaging size and vehicle weight while also increasing the exhaust system volume, which affects exhaust gas pressure/energy. Accordingly, improved flow control systems for an engine having a twin scroll turbocharger and an HPEGR system are presented herein. A method of controlling these flow control systems is also presented.

Figure 1:
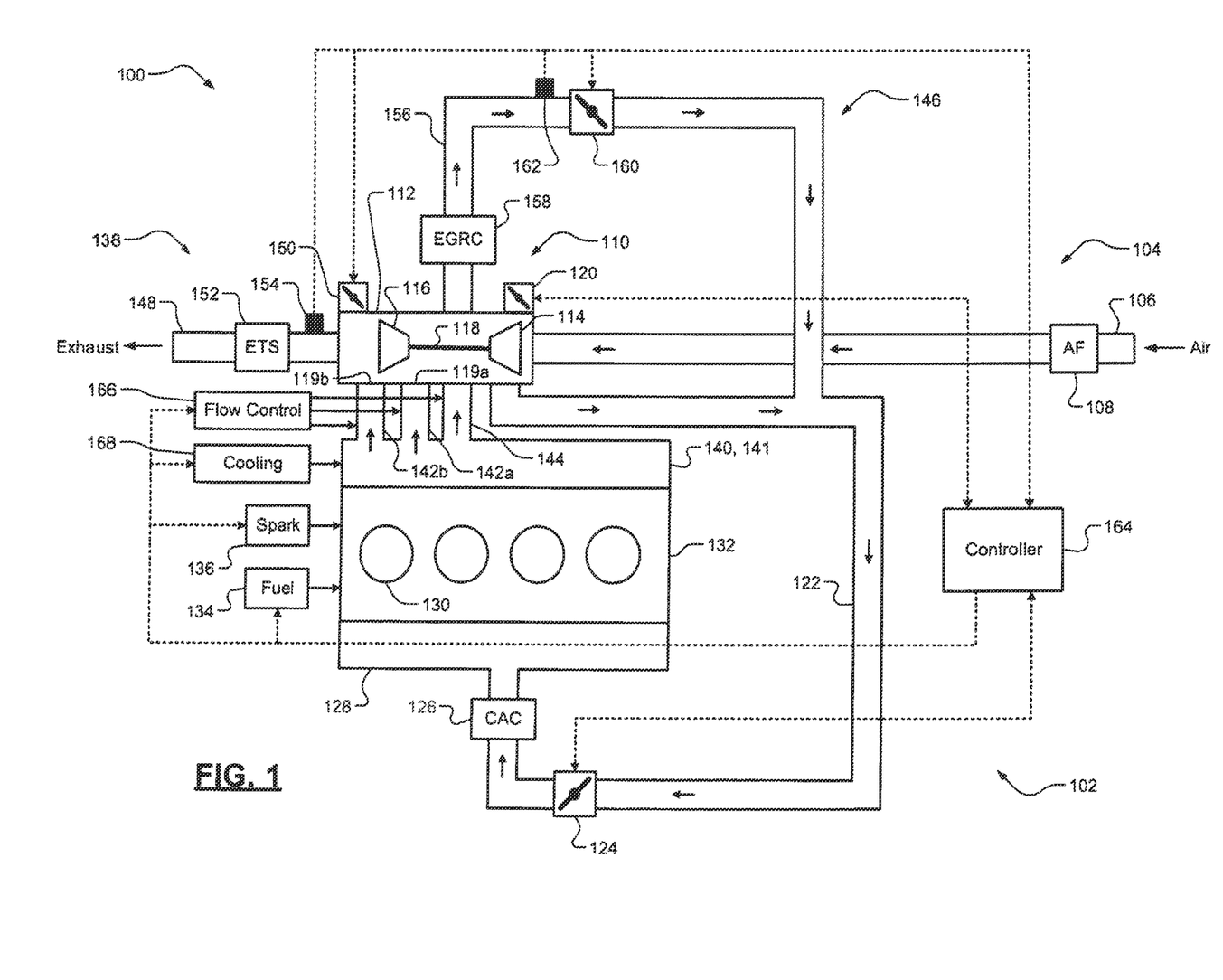
FIG. 1 is a diagram of an example vehicle having an engine with a twin scroll turbocharger, a high pressure exhaust gas recirculation (HPEGR) system, and a flow control system according to the principles of the present disclosure.

Referring now to FIG. 1, a diagram of an example vehicle 100 having an example engine 102 is illustrated. Air is drawn through an induction system 104 comprising an induction passage 106 with an air filter 108 disposed therealong. A twin scroll turbocharger system 110 comprises a housing 112 that houses a compressor wheel 114 (hereinafter, "compressor 114") that is rotatably driven by a turbine wheel 116 (hereinafter, "turbine 116") via a shaft 118. The turbine 116 is driven by exhaust gas produced by the engine 102 as received via first and second inlet tracts or scrolls 119a, 119b, which causes the compressor 114 to force air through the induction system 104 thereby increasing an air charge for combustion. An optional bypass or surge valve system 120 selectively bypasses the compressor 114 or otherwise releases pressure in the induction system 104. After the compressor 114, intake air flows through induction passage 122 having a throttle valve 124 and an optional charge air cooler (CAC) 126 disposed therealong. The throttle valve 124 regulates the flow of the intake air into an intake manifold 128 and the CAC 126 cools the intake air, which allows for better combustion and power generation.

The air in the intake manifold 128 is then distributed to a plurality of cylinders 130 arranged in a cylinder head 132 of the engine 102. While four cylinders are shown, it will be appreciated that the engine 102 could include any suitable number of cylinders (6, 8, 10, 12, etc.). The air is also combined with fuel from a fuel system 134 (fuel tank, fuel pump, fuel rail, fuel injectors, etc.) and combusted (e.g., by spark from an optional spark system 136) to drive pistons (not shown) that rotatably turn a crankshaft (not shown) to generate drive torque for vehicle propulsion. Exhaust gas resulting from combustion of the air/fuel charges within the cylinders 130 is expelled into an exhaust system 138 that comprises an exhaust manifold 140 comprising a housing 141. While shown as a separate device (e.g., a bolt-on exhaust manifold), it will be appreciated that the exhaust manifold 140 could be an integrated exhaust manifold that is at least partially integrated into the cylinder head 132, which will be discussed in greater detail below. The exhaust gas in the exhaust manifold 140 is selectively distributed amongst various exhaust passages 142a, 142b, and 144.

While the exhaust manifold 140 is shown to be receiving exhaust gas from each of the cylinders 130, it will be appreciated that the exhaust manifold 140 could include multiple distinct passages that connect to exhaust passages 142a, 142b, and 144. For example, two of the four cylinders 130 could be associated with exhaust passage 142a and the other two of the four cylinders 130 could be associated with exhaust passage 142b, and exhaust passage 144 could be associated with exhaust passage 142a and/or exhaust passage 142b. Exhaust passage 142a is in fluid communication with scroll 119a and exhaust passage 142b is in fluid communication with scroll 119b. Exhaust passage 144 is in fluid communication with an HPEGR system 146, which will be described in greater detail below. After powering the turbine 116, the exhaust gas proceeds to a final exhaust passage 148 of the exhaust system 138. An optional wastegate valve system 152 selectively bypasses the turbine 116 or otherwise releases pressure in the exhaust system 138.

An optional exhaust treatment system (ETS) disposed along final exhaust passage 148 treats the exhaust gas to mitigate or eliminate emissions (carbon monoxide, hydrocarbons, nitrogen oxides, particulate matter, etc.) before it is released into the atmosphere. One or more optional sensors 154 disposed in the exhaust system measure parameters such as exhaust gas oxygen concentration (e.g., a wide-range oxygen, or WRO2 sensor). The HPEGR system 146 comprises an HPEGR passage 156 having an optional EGR cooler (EGRC) 158 disposed therealong that cools the exhaust gas. An HPEGR valve 160 (e.g., a butterfly valve) selectively regulates the flow of exhaust gas through the HPEGR system 146 based on engine operating parameters. An optional HPEGR temperature sensor 162 measures a temperature of the exhaust gas flowing through the HPEGR system 146. After the HPEGR valve 160, the recirculated exhaust gas is introduced to the induction system 104 at a point along induction passage 122 after the compressor 114.

A controller 164 controls operation of the vehicle 100 and, in particular, the engine 102. This includes, for example only, controlling airflow, fueling, and spark to generate drive torque that meets a torque request (e.g., based on input from a driver via an accelerator pedal, not shown). It will be appreciated that the engine 102 could include other sensors that are not illustrated, such as temperature sensors, pressure sensors, component position/speed sensors, and the like. For example only, the engine 102 could include an engine speed sensor that measures crankshaft speed. A flow control system 166 according to the principles of the present disclosure controls exhaust gas flow to each of exhaust passages 142a, 142b, and 144. For an integrated exhaust manifold configuration, a cooling system 168 (e.g., a water jacket or other water-based system) is configured to cool exhaust gas produced by the engine 102, e.g., to protect componentry of the EGRC 158 and the HPEGR valve 160.

Figure 2:
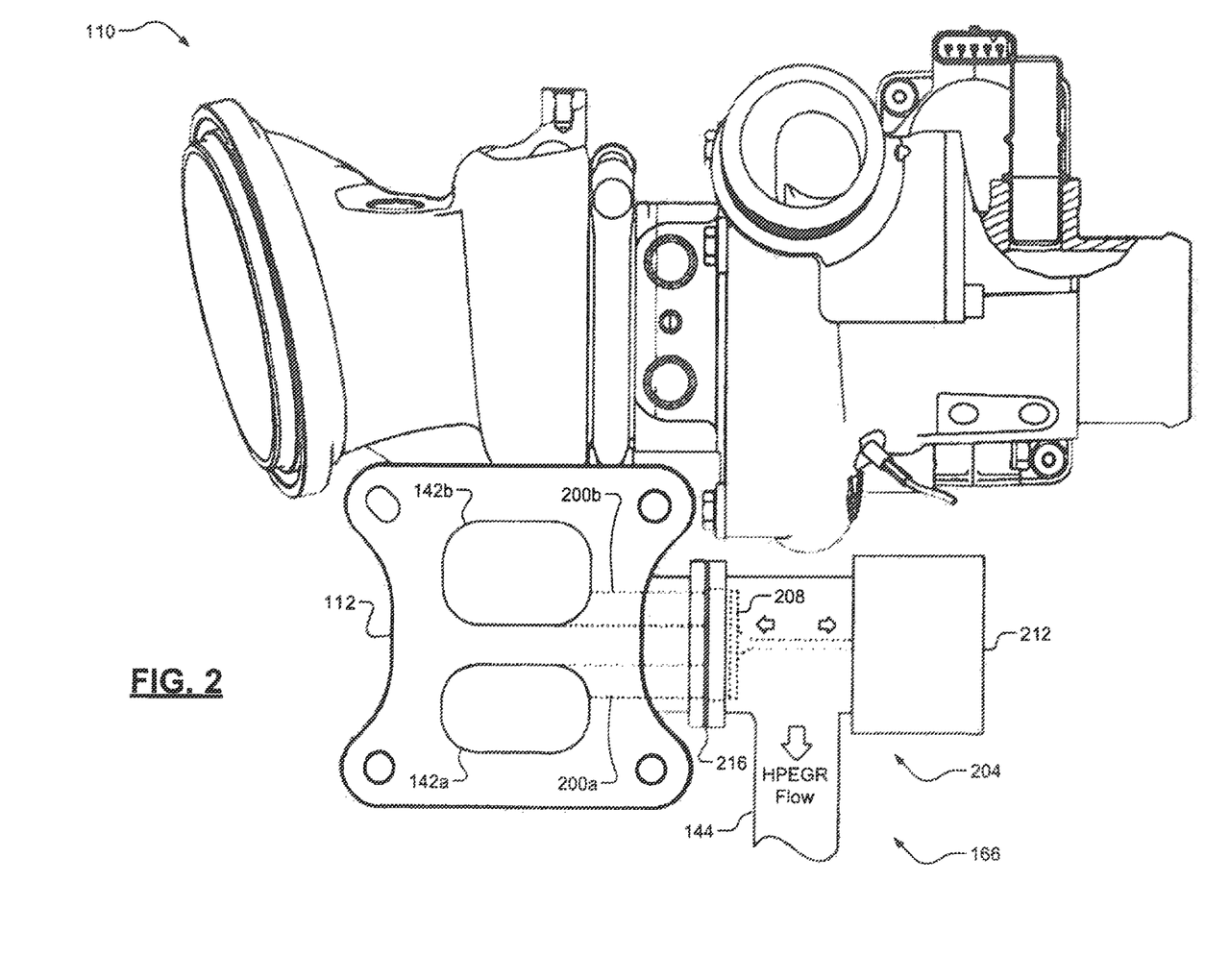
FIG. 2 is a cross-sectional diagram of a first embodiment of the flow control system integrated in a housing of the Min-scroll turbocharger according to some principles of the present disclosure.

Referring now to FIG. 2, a first embodiment of the flow control system 166 is illustrated. In this embodiment, the flow control system 166 comprises first and second passages 200a, 200b defined in the housing 112 of the twin scroll turbocharger system 110. First passage 200a is fluidly connected to exhaust passage 142a and second passage 200b is fluidly connected to exhaust passage 142b, The flow control system 166 further comprises a single poppet valve 204 that comprises a plunger or mushroom member 208 that is laterally displaced between open and closed positions by an actuator 212 (e.g., electronically controlled by the controller 164). In a closed position, member 208 is seated or sealed (e.g., against a gasket 216) thereby fluidly disconnecting passages 200a, 200b, and 144. In an open position, however, member 208 is retracted thereby fluidly connecting passages 200a, 200b, and 144. This also causes a fluid connection between exhaust passages 142a and 142b, thereby causing the twin scroll turbocharger system 110 to operate as a single or mono scroll turbocharger would.

In the closed position, HPEGR flow is disabled and the twin scroll turbocharger system 110 operates as a twin scroll turbocharger, which could be desirable for low engine speed performance. In the open position, however, the twin scroll turbocharger system 110 operates as a mono scroll turbocharger and HPEGR is enabled, which could be desirable for high engine speed/load operation. In one exemplary implementation, the poppet valve 204 is configured to only transition between the open and closed positions (i.e., no intermediary or partially open positions). One benefit of this configuration is that passages 200a and 200b are integrated into the existing housing 112 of the twin scroll turbocharger system 110. Therefore, no additional exhaust passages/piping is required. In addition, exhaust system volume is not substantially increased. Another benefit is that only a single poppet valve 204 is utilized, thereby decreasing costs compared to systems that would use multiple more expensive and complicated flow control valves (e.g., butterfly valves). The poppet valve 204 also performs well in sealing when in the closed state (e.g., because member 208 could be spring-loaded and then only retracted when actuator 212 is energized).

Figure 3A:
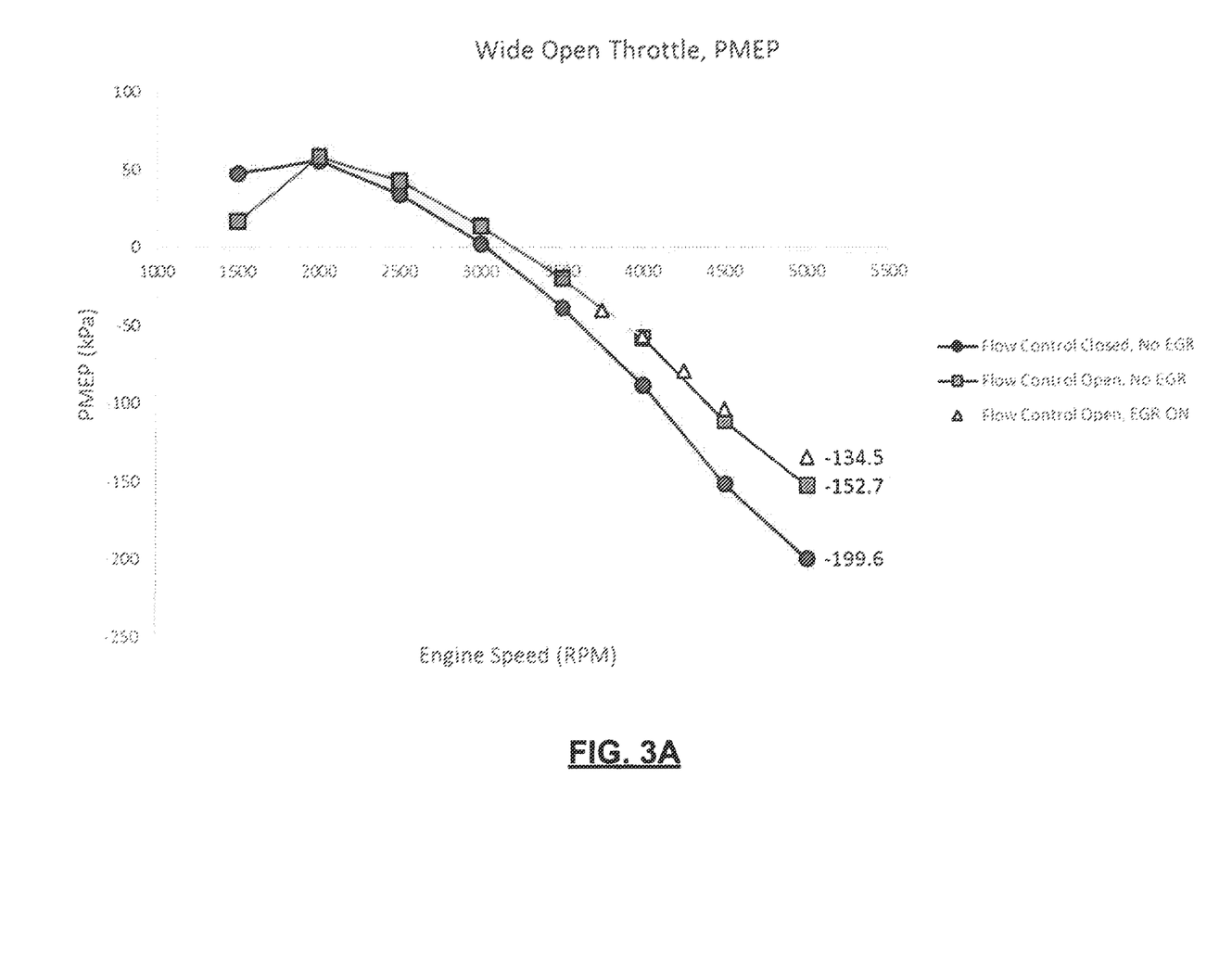
FIGS. 3A-3C are plots of example pumping mean effective pressure (PMEP), thermal enrichment, and brake-specific fuel consumption (BSFC) benefits of the flow control system of FIG. 2 according to the principles of the present disclosure.
Figure 3B:
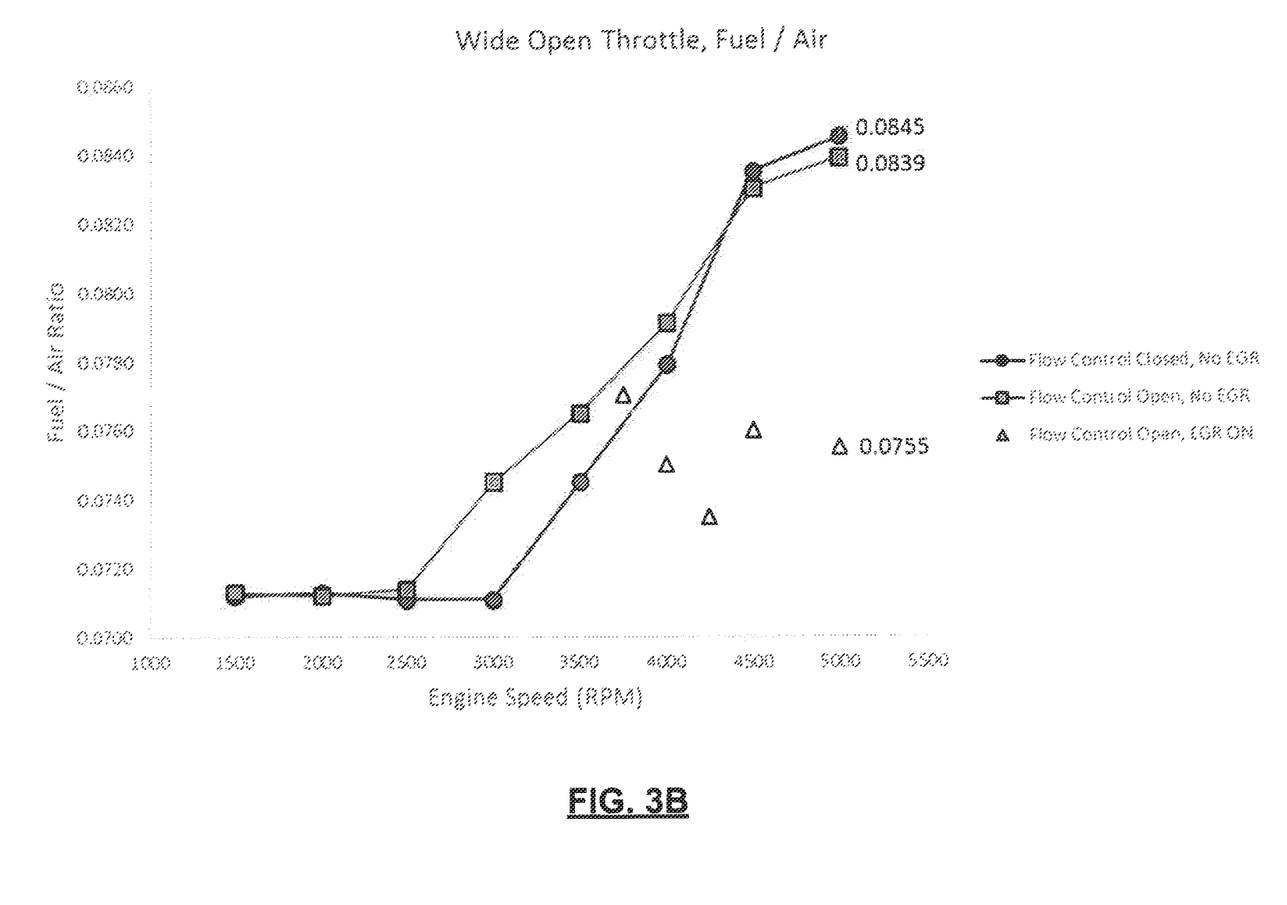
Figure 3C:
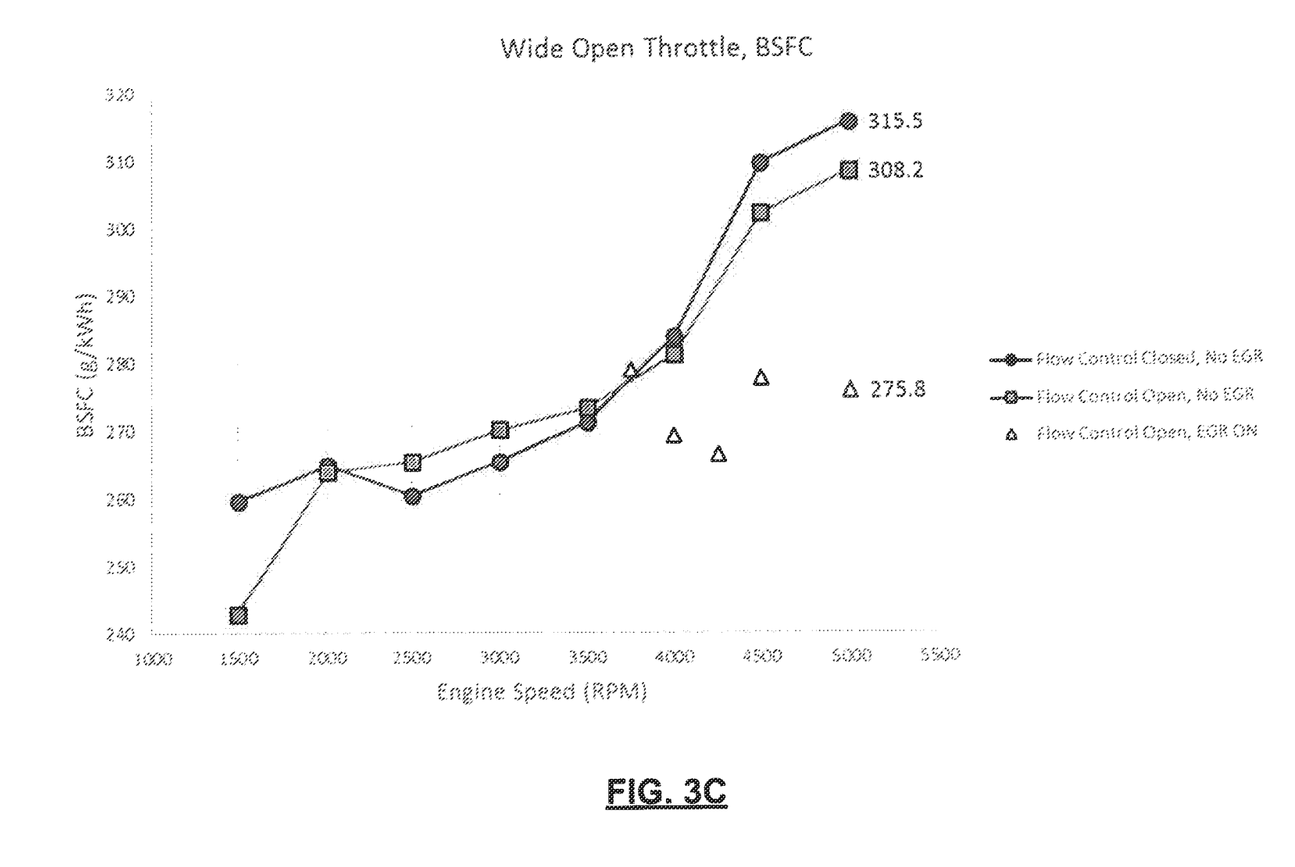

Referring now to FIGS. 3A-3C, plots of example performance data of the flow control system 166 of FIG. 2 are illustrated. In FIG. 3A, it can be seen that there is a substantial reduction in pumping work (e.g., ~46.9 kilopascals (kPa), or 23.5%) at wide-open throttle (WOT) and an engine speed of approximately 5000 revolutions per minute (RPM) with the flow control system 166 open. It can also be seen that there is even further reduction in pumping work (e.g., ~18.2 kPA, or 11.9%) at this operating condition with the flow control system 166 open and EGR flowing (e.g., via control of the HPEGR valve 160). In total, there is a substantial benefit on pumping mean effective pressure (PMEP) of ~65.1 kPA or 32.6%.

In FIG. 3B, it can be seen that there is a small reduction in thermal enrichment (exhaust gas fuel/air enrichment) when the flow control system 166 is open at high engine speeds (e.g., greater than 4000-4500 RPM). Further, HPEGR in these upper engine speed ranges significantly reduces thermal enrichment (e.g., ~0.0084 less fuel required to maintain scroll temperature limit of ~930 degrees Celsius). In FIG. 3C, it can be seen that there is also a substantial brake-specific fuel consumption (BSFC) improvement, which is to be expected with the previously discussed PMEP reduction and thermal enrichment benefits. The reduction of thermal enrichment through the use of HPEGR, however, is a much more significant factor in the BSFC improvement. Collectively, the performance data of FIGS. 3A-3C supports that the use of the flow control system 166 can improve engine efficiency and fuel economy along with decreasing emissions with a minimal impact to vehicle costs/complexity/packaging/weight.

Figure 4:
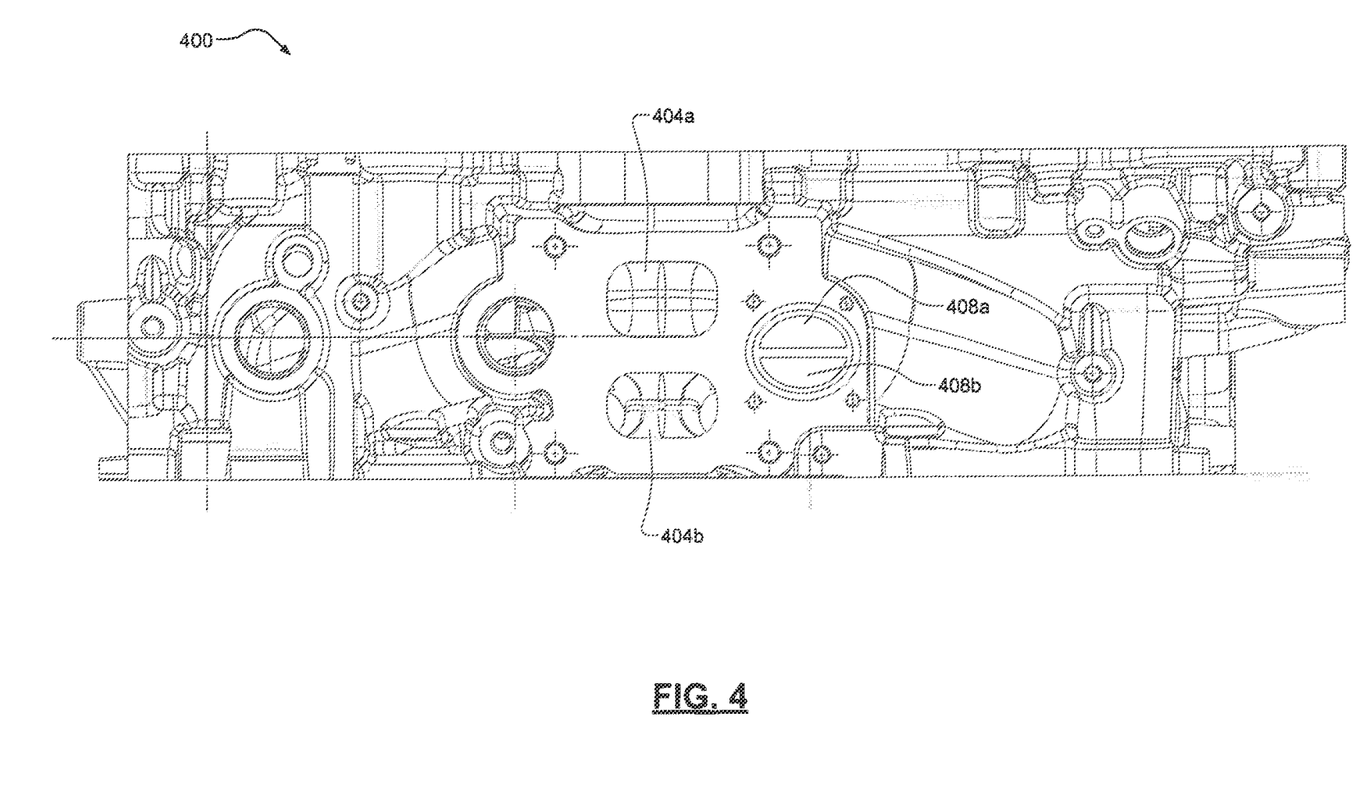
FIG. 4 is a cross-sectional diagram of a second embodiment of the flow control system integrated in an integrated exhaust manifold of the engine according to some principles of the present disclosure.

Referring now to FIG. 4, a second embodiment of the flow control system 166 is illustrated. Specifically, this second embodiment comprises an integrated configuration 400 of the exhaust manifold 140. In this configuration, exhaust runner 404a is fluidly connected to two of the four cylinders 130 (e.g., cylinders 1 and 4) and exhaust runner 404b is fluidly connected to the other two cylinders 140 (e.g., cylinders 2 and 3), but it will be appreciated that other exhaust runner and engine cylinder configurations could be utilized. Exhaust passages 408a and 408b defined in the integrated intake manifold housing 141 are fluidly connected to exhaust runners 404a and 404b, respectively. A similar or different type of system as FIG. 2 (e.g., a poppet valve-style system) is then added to control exhaust gas flow from exhaust passages 408a, 408b to exhaust passages 142a, 142b, and 144. One potential benefit of incorporating the flow control system into an integrated exhaust manifold is the ability to provide cooling (e.g., from cooling system 168, such as a water jacket) to both cool the exhaust gas and protect system componentry (e.g., the poppet valve 204) from potential damage caused by high exhaust gas temperatures.

Figure 5:
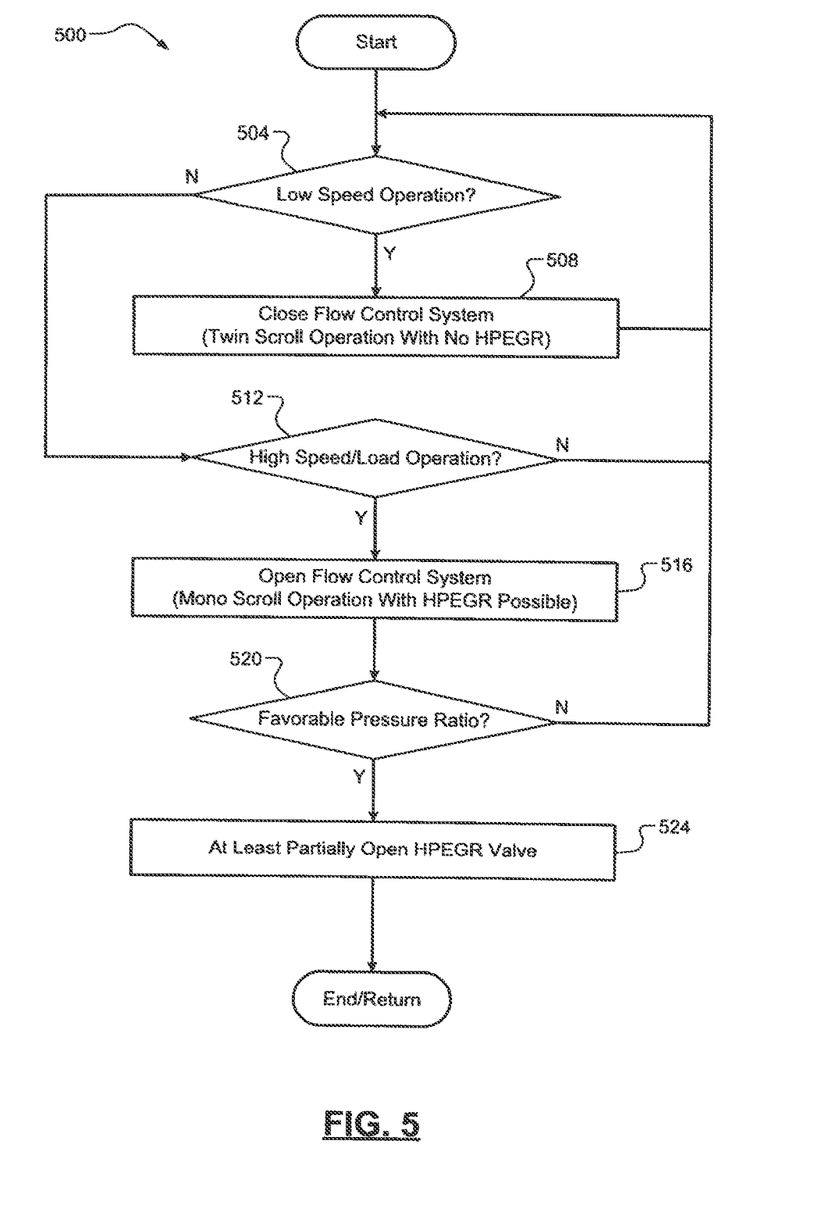
FIG. 5 is a method of controlling the flow control system according to the principles of the present disclosure.

Referring now to FIG. 5, a flow diagram of a method 500 of operating the flow control system 166 is illustrated. At 504, the controller 164 determines whether low speed operation of the engine 102 is occurring. For example, this could include determining whether the engine speed is below a calibratable engine speed threshold. When true, the method 500 proceeds to 508 where the controller 164 commands the flow control system 166 to close to provide twin scroll operation with no HPEGR. When false, however, the method 500 proceeds to 512. At 512, the controller 164 determines whether high speed operation of the engine 102 is occurring. For example, this could include determining whether the engine speed is above a calibratable engine speed threshold. It will be appreciated that this step could also be implied by previous step 504. When false, the method 500 ends or returns to 504. When true, however, the method 500 proceeds to 516 where the controller 164 commands the flow control system 166 to open to provide mono or single scroll operation with HPEGR possible. At 520, the controller 164 determines whether there is a favorable pressure ratio such that the HPEGR valve 160 can be opened, i.e., when turbine inlet pressure exceeds compressor discharge pressure. When true, the controller 164 at least partially opens the HPEGR valve 160 to provide HPEGR operation at 524. When false, however, the method 500 ends or returns to 504.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An exhaust flow control system for an engine of a vehicle, the engine having a twin scroll turbocharger and a high pressure exhaust gas recirculation (HPEGR) system, the exhaust flow control system comprising:

a housing defining first and second passages that are fluidly connected to first and second scrolls of the twin scroll turbocharger and to the HPEGR system; and a flow control system comprising:

a poppet valve configured to (i) in an open position, fluidly connect the first and second scrolls to each other and to the HPEGR system via the first and second passages and (ii) in a closed position, fluidly disconnect the first and second scrolls from each other and from the HPEGR system; and a controller configured to command the poppet valve to one of the open and closed positions based on one or more operating parameters of the engine, thereby allowing the twin scroll turbocharger to operate in both a twin scroll mode and a mono scroll mode depending on the one or more engine operating parameters while also allowing for HPEGR control with minimal additional system volume.

2. The exhaust flow control system of claim 1, wherein the housing is a housing of the twin scroll turbocharger.

3. The exhaust flow control system of claim 1, wherein the housing is a housing of an integrated exhaust manifold at least partially integrated into a cylinder head of the engine, wherein the first and second passages are also fluidly connected to first and second sets of cylinders of the engine, respectively.

4. The exhaust flow control system of claim 3, wherein the engine is an in-line four cylinder engine and the first set of cylinders comprises a first cylinder and a fourth cylinder and the second set of cylinders comprises a second cylinder and a third cylinder.

5. The exhaust flow control system of claim 3, further comprising a cooling system configured to cool the integrated exhaust manifold, the exhaust gas therein, and the poppet valve.

6. The exhaust flow control system of claim 5, wherein the cooling system is a water jacket.

7. The exhaust flow control system of claim 1, wherein the controller is configured to command the poppet valve to the open position when at least one of engine speed and engine load exceeds a respective threshold.

8. The exhaust flow control system of claim 7, wherein the controller is configured to command the poppet valve to the closed position when engine speed is less than a threshold.

9. The exhaust flow control system of claim 8, wherein the controller is configured to command the poppet valve to the open and closed positions to (i) decrease pumping mean effective pressure (PMEP) of the engine, (ii) decrease thermal enrichment of the exhaust gas produced by the engine, and (iii) decrease brake-specific fuel consumption (BSFC) of the engine.

10. The exhaust flow control system of claim 1, wherein the poppet valve comprises a plunger or mushroom valve member that is moved between the open and closed positions by an actuator that is electronically controlled by the controller.

11. The exhaust flow control system of claim 1, wherein the HPEGR system further comprises an HPEGR butterfly valve that is controlled by the controller to regulate flow through the HPEGR system.

12. The exhaust flow control system of claim 1, wherein the open and closed positions are fully-open and fully-closed positions, respectively, and wherein the poppet valve is configured to operate in only one of these two positions.

13. The exhaust flow control system of claim 1, wherein the engine is a four cylinder engine having a first two cylinders fluidly connected to the first scroll and a second two cylinders fluidly connected to the second scroll.

* * * * *